US006129387A

United States Patent [19]
Chess

[11] Patent Number: 6,129,387
[45] Date of Patent: Oct. 10, 2000

[54] PRESSURE SENSITIVE LIBRARY CARD HOLDER

[75] Inventor: Stanley Chess, Golfstown, N.H.

[73] Assignee: Moore North America, Inc., Grand Island, N.Y.

[21] Appl. No.: 09/348,240

[22] Filed: Jul. 6, 1999

[51] Int. Cl.[7] ............................ B32B 31/00; B42D 15/00

[52] U.S. Cl. ............................... 283/62; 283/55; 283/116; 229/69; 229/72; 428/41.8; 428/40.1; 428/42.1; 428/121

[58] Field of Search ................................ 283/55, 62, 116; 229/69, 72; 428/41.8, 40.1, 42.1, 121

[56] References Cited

U.S. PATENT DOCUMENTS 5,125,561 6/1992 Idstein .
5,318,324 6/1994 Lombardo et al. ........................ 283/62
5,427,640 6/1995 Daniels .
5,694,743 12/1997 Beighle .

*Primary Examiner*—Willmon Fridie, Jr.
*Assistant Examiner*—Mark T. Henderson
*Attorney, Agent, or Firm*—Nixon & Vanderhye P.C.

[57] ABSTRACT

An intermediate for a card holder, the card holder produced from the intermediate, and a method of making the card holder, are provided which are particularly useful for easily and efficiently making and attaching a card holder to a library book, or other object that a card holder is desirably associated with. The card holder is formed from an intermediate having a first (e.g. paper) ply, a second release liner ply, and pressure sensitive adhesive or cohesive holding the plies together. Various die cuts and lines of weakness (such as perf lines) are provided in the plies so as to facilitate easy assembly of the card holder from an integral sheet by removing various die cut strips or sections in sequence to readily fold the intermediate after imaging (for example with a laser printer) and then apply the card holder formed with the pressure sensitive adhesive or cohesive already associated with the intermediate, to a library book or the like.

22 Claims, 5 Drawing Sheets

10
11
11
19
15
18
17
36
13
45
45
45
47
30
46
14
24
48
28
51
47
46
52
35
37
33
34
33
34
16
19

10
14
21
20
12
25
26
16
15
24
13
45
48

PRESSURE SENSITIVE LIBRARY CARD HOLDER

BACKGROUND AND SUMMARY OF THE INVENTION

In the construction of pocket forming elements which are fastened inside library books to hold a 3×5 card, and to indicate the due date for the library book, etc., typically it is necessary to purchase an envelope and a separate information card. The separate information card is preprinted and stapled or otherwise affixed to the open top envelope. This requires purchase of different components, assembly time, and is not conveniently practiced using on site conventional printers, such as laser printers.

Two prior art constructions that provide library card holders that are simple, and constructed in a simple manner, are shown in U.S. Pat. Nos. 5,318,324 and 5,427,640 (the disclosures of which are hereby incorporated by reference herein). However the library card holder formed pursuant to the U.S. Pat. No. 5,318,324 requires one to apply additional adhesive, or other conventional means, to hold the library card holder to the book (that is the book attachment mechanism is not inherently provided with the holder), and the U.S. Pat. No. 5,427,640 either requires spot coating of adhesive or there is a chance that insertion of the library card into the holder could expose adhesive that would stick to the library card, and if conventional size sheets (such as 8½×11 or A-4) are used then additional labels or other elements must be formed otherwise there is significant waste.

According to the present invention an intermediate for making a card holder, a card holder, and a method of making a card holder, are provided which are simple and effective, allow card holders to be made from conventional sized sheets, and provide attachment adhesive or cohesive for applying the card holder to a book, or other objects with which it would be associated, integrally with the card holder. All of the advantageous features of the library card holders according to the prior art are provided, as well as additional advantages.

While the invention will be herein shown and described with respect to a library card holder, it is to be understood that the products and techniques thereof may also be applicable to other card holders, such as for medical records, time sheets, and the like.

According to one aspect of the present invention an intermediate for a card holder is provided comprising: A first (preferably paper but possibly plastic) ply, a second release liner ply, and pressure sensitive adhesive or cohesive releasably holding the plies together. The plies each having substantially coextensive top and bottom edges substantially parallel to each other, and substantially coextensive first and second side edges substantially parallel to each other and substantially perpendicular to the top and bottom edges. The first ply having a top face and a bottom face, the bottom face including the pressure sensitive adhesive or cohesive. The first and second side edges of the first ply including first and second die cut strips, respectively, provided therein in a center section of the side edges, so that an upper section above the die cut strips, and a lower section below the die cut strips, are provided. And, first and second lines of weakness provided in the first ply lower section substantially parallel to the side edges and spaced therefrom, and defining side flaps.

The intermediate typically further comprises indicia imaged on the top face of at least one of the upper section and lower section. The top and bottom edges may be about 4.52 inches or about 10.5 cm long, and the side edges are each about 11 inches or about 29.6 cm long, which facilitates manufacture of the intermediate from a sheet of 8½×11 inch paper, or an A-4 sheet. For example according to the invention the intermediate may be part of an 8½×11 inch or A-4 sheet, and a second intermediate substantially identical to the intermediate is provided adjacent thereto in the 8½×11 inch or A-4 sheet.

Preferably the lower section has a length along each of the side edges about half the length of each of the die cut strips, and the liner ply has a die cut therein substantially parallel to the top and bottom edges, and approximately equidistant between the top and bottom sections. Also preferably the liner ply has third and fourth, respectively, die cut strips formed therein at the first and second side edges of the liner ply, each of the third and fourth die cut strips being wider than the first and second die cut strips, and extending from a point closer to the top edge than each of the first and second die cut strips substantially all the way to the bottom edge.

Typically the paper ply comprises from 16 pound-125 pound (preferably about 60–100 pound) tag stock (the designation "pound" meaning pounds per 11×17 inch 1000 sheet ream), or it can be a plastic web (possibly non-printable, but preferably printable), e.g. polyester about 1–7 mil thick. The exact weight will depend upon usage, but for most paper library card holders the paper would have a weight between about 60–100 pounds. The liner ply preferably is entirely conventional silicone release liner. The adhesive or cohesive may be removable or permanent, and of any suitable conventional type. Typical thickness of the adhesive is from 0.3–1.5 mil, with a normal thickness being between about 0.6–0.9 mil.

The indicia imaged on the top face of at least one of the upper section and the lower section preferably comprises library card holder indicia, and the entire intermediate is dimensioned so as to be useful for the manufacture of a library card holder, and attachment to a book (e.g. the inside cover). The indicia is preferably laser toner from a laser printer, although handwriting, typing, or non-impact or impact printers aside from laser printers, may be used to apply the imaged indicia.

According to another aspect of the present invention a card holder is provided comprising: An upper section having a top edge with a first width, and a bottom demarcation substantially parallel to the top edge, a top face, and a bottom face. A lower section having top and bottom substantially parallel edges each having a second width, a top face and a bottom face, and first and second side flaps defined along side edges thereof. First and second intermediate sections aligned with the lower section, the first intermediate section being a substantial continuation of the upper section, each of the intermediate sections having a front face and a rear face. Pressure sensitive adhesive or cohesive provided on at least part of the bottom faces of both the upper and lower sections including on the lower section side flaps bottom face, and on at least a part of the rear face of at least the first intermediate section, so that pressure sensitive adhesive or cohesive on the lower section side flaps bottom face holds the lower section and the intermediate sections together, and so that the front faces of the intermediate sections define a non-adhesive open space therebetween. And, wherein the upper, lower, and intermediate sections are substantially a continuous piece of paper or plastic.

The card holder typically further comprises indicia imaged on the top face of at least one of the upper and lower sections, and wherein the top edge of the lower section is substantially aligned with the lower demarcatiof the upper section. In the preferred embodiment the indicia comprises library card holder indicia, and the open space is dimensioned to receive, and does receive, a bottom portion of a library card therein, and wherein the upper section and first intermediate section pressure sensitive adhesive or cohesive is attached to a library book.

Typically the first width and the second width, including the side flaps, are substantially equal, and the first and second intermediate sections each have substantially a third width, the third width substantially equal to the second width minus the widths of the side flaps. In the preferred embodiment the pressure sensitive adhesive or cohesive substantially completely covers the bottom faces of the upper and lower sections, and the rear faces of both of the intermediate sections. The card holder may further comprise laser toner indicia imaged on the top face of both of the upper and lower sections, and the paper of the card holder preferably comprises between about 60–100 pound tag stock.

According to another aspect of the present invention there is provided a method of making a card holder utilizing a multi-ply sheet having a first (preferably paper) ply, a second release liner ply, and pressure sensitive adhesive or cohesive releasably holding the plies together, the plies each having substantially coextensive top and bottom edges substantially parallel to each other, and substantially coextensive first and second side edges substantially parallel to each other and substantially perpendicular to the top and bottom edges, and the first ply having a top face and a bottom face, the bottom face including the pressure sensitive adhesive or cohesive. The method preferably comprises: (a) Forming first and second die cut strips, respectively, provided in a center section of the first and second side edges of the first ply, so that an upper section above the die cut strips and a lower section below the die cut strips, are provided. (b) Forming first and second lines of weakness in the first ply lower section substantially parallel to the side edges and spaced therefrom, the lines of weakness forming side flaps along the side edges of the lower section. (c) Forming die cuts in the liner ply, that do not significantly extend into the first ply, to define a first liner ply section that covers at least the upper section of the first ply, and a second liner ply section that covers at least the lower section of the first ply. Then, (d) removing the second liner ply section from the paper ply, and removing the first and second die cut strips from the first ply. Then, (e) folding the lower section with respect to the upper section to provide two intermediate sections of the first ply underlying the lower section and to provide a top edge of the lower section substantially aligned with a bottom line of demarcation of the upper section. Then, (f) folding the side flaps of the lower section so as to wrap around the intermediate sections and so that the pressure sensitive adhesive or cohesive on the bottom face of the side flaps adheres the lower section to the intermediate sections, and to define an open card-receiving volume between the intermediate sections to form a card holder. (g) Removing the first liner ply section from the first ply. And then, (h) moving the adhesive or cohesive uncovered by (g) into contact with a surface to attach to the surface.

The method typically further comprises (i), prior to (d), imaging at least one of the top faces of the upper and lower sections with indicia by passing the sheet through an automatic imaging device. For example (i) may be practiced by passing the sheet through a non-impact printer, such as a laser printer. Typically (i) is practiced to image library card holder indicia, and (h) is practiced to move the card holder into contact with a surface of a library book, and the method further comprises inserting a library card into the open card-receiving volume between the intermediate sections.

In the method (c) may be is practiced to provide side die cut strips approximately twice as wide as the side flaps of the lower section, and to provide as the first liner ply section a liner ply section that covers the first ply upper section and the intermediate section immediately adjacent the first ply upper section.

Typically the multi-ply sheet is originally dimensioned to provide two substantially identical card holders side-by-side, with the first side edge of one integral with the second side edge of the other; and the method further comprises: practicing (a)–(c) for both card holders at substantially the same time; and (i), before (d), slitting the sheet to form the first side edge of one card holder and the second side edge of the other card holder, so as to form two distinct card holders. Most desirably, (a)–(i) are practiced starting with an 8.5×11 inch, or A-4, paper sheet, and wherein each card holder, before (d), has a width of about 4.25 inches or about 10.5 cm and a length of about 11 inches or about 29.6 cm.

It is the primary object of the present invention to provide for the effective, simple and highly advantageous manufacture of card holders, or intermediates for card holders, such as for library card holders. This and many other objects of the invention will become clear from an inspection of the detailed description of the invention, and from the appended claims.

DETAILED DESCRIPTION OF THE DRAWINGS

Figure 1:
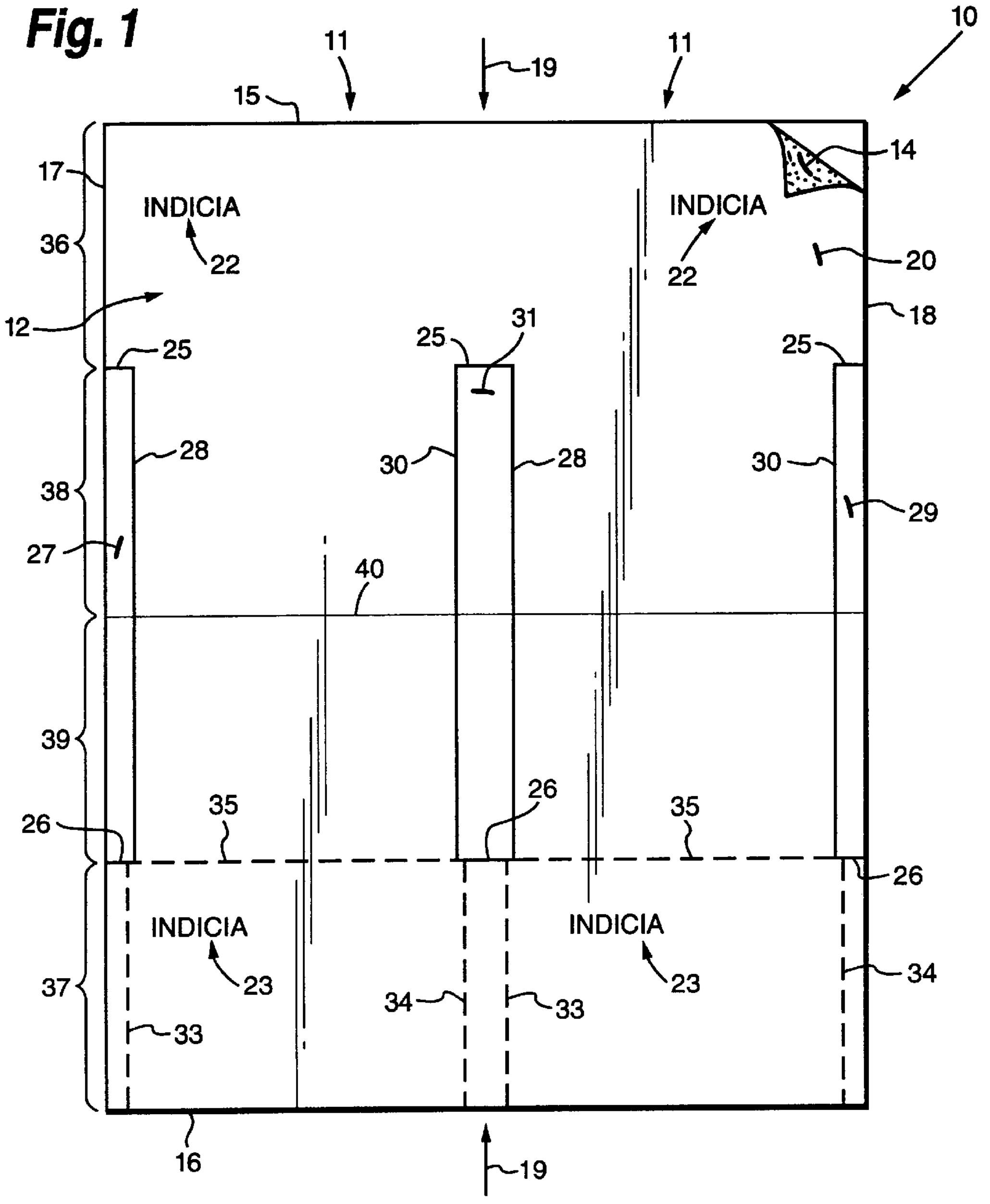
FIG. 1 is a top plan view of an exemplary embodiment of an intermediate according to the present invention.
Figure 2:
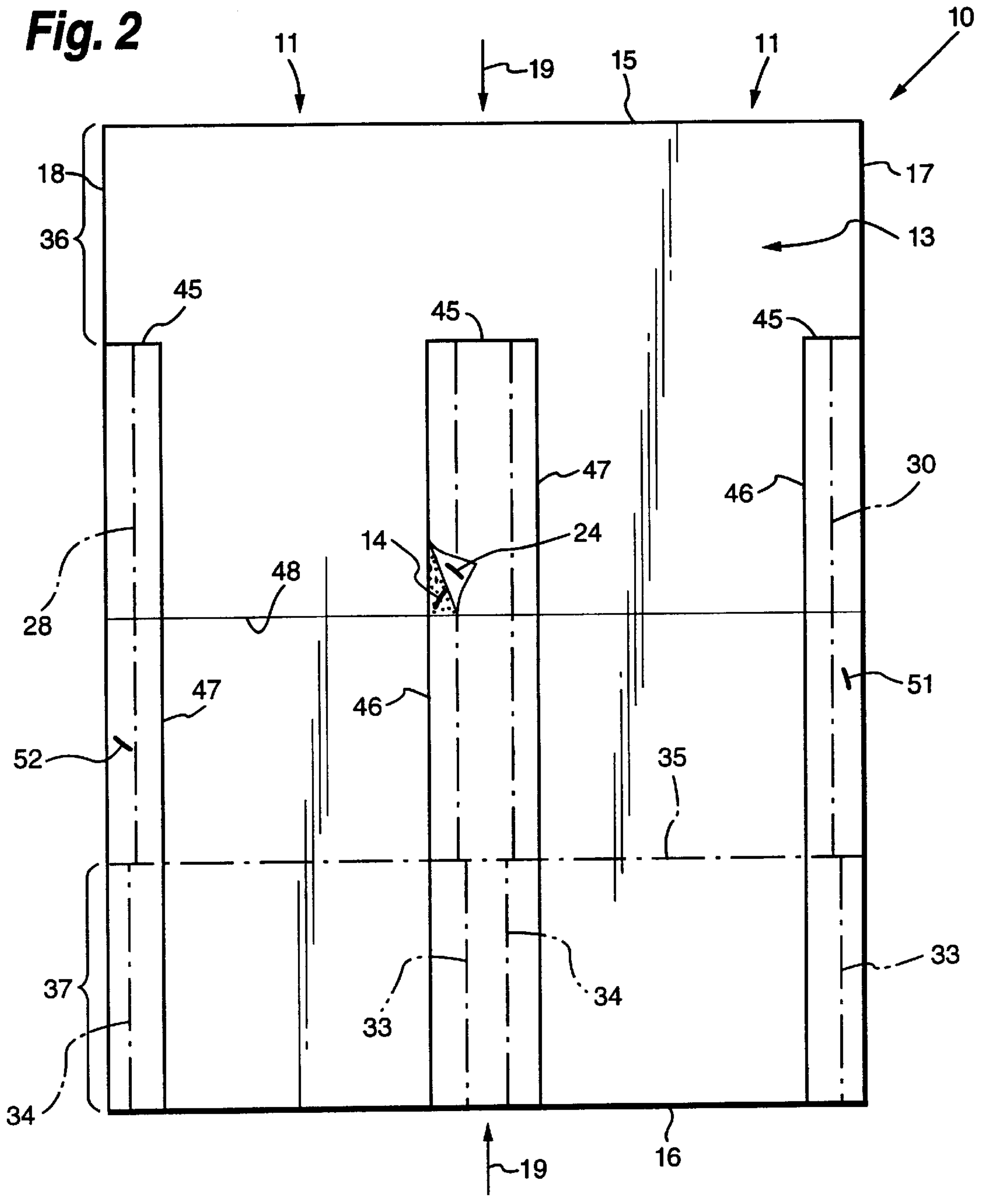
FIG. 2 is a bottom plan view of the intermediate of FIG. 1.
Figure 3:
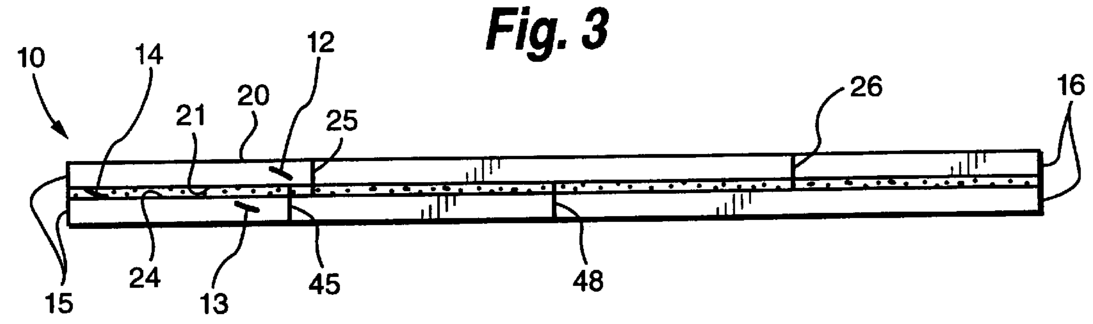
FIG. 3 is a side schematic view, with the components greatly exaggerated in size, and in relative size, for clarity of illustration, of the intermediate of FIGS. 1 and 2.

FIGS. 1 through 3 show a multi-ply sheet which forms an intermediate according to the preferred embodiment of the present invention. The multi-ply sheet is, in the embodiments illustrated in FIGS. 1 through 3, preferably either an 8½×11 inch sheet or an A-4 size sheet, although other sizes may be utilized if desired. The sheet 10 may originally be in continuous format, but preferably is a cut sheet as illustrated in FIGS. 1 through 3, and can be fed into a conventional laser, or other, printer.

Figure 4:
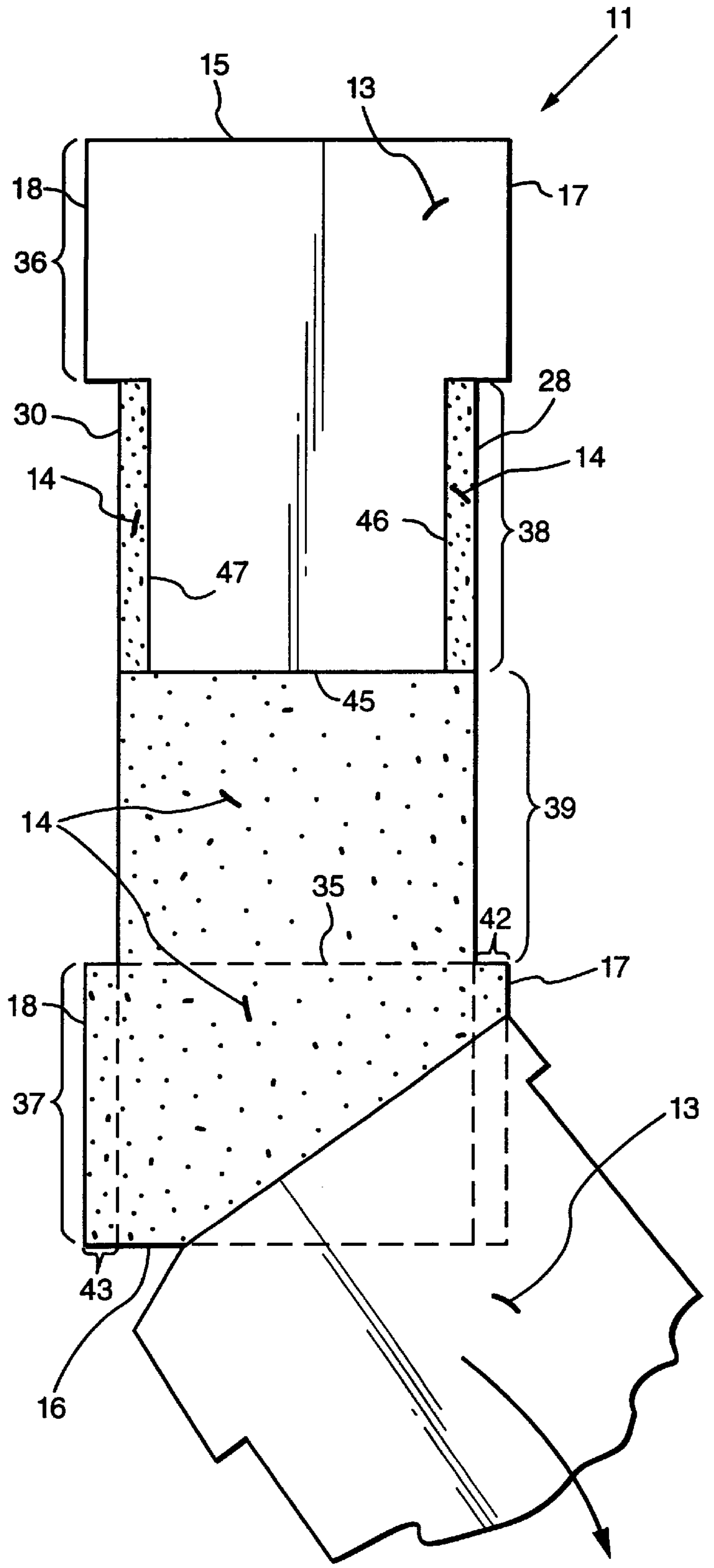
FIG. 4 is a bottom plan view of the intermediate of FIGS. 1 and 2 after slit into a single card holder, and with the side die cut strips and the lower release liner removed, and schematically illustrating removable of the lower release liner.

The sheet 10 actually forms two intermediates, indicated schematically by reference numerals 11 in FIGS. 1 and 2, and an intermediate 11 after removal of various portions thereof being shown in FIG. 4. Each of the intermediates 11 of the sheet 10 comprise a first (preferably paper, but possibly plastic) ply 12 (FIGS. 1 and 3) and a second release liner ply 13 (see FIGS. 2 and 3), and pressure sensitive adhesive or cohesive 14 (see FIGS. 1 through 3) releasably holding the plies 12, 13 together. The first ply 12 preferably comprises paper which ranges from 16 pound to 125 pound tag stock, typically between about 60–100 pound for most library card or related purposes. Alternatively plastic, such as 1–7 mil thick polyester, may be used. The release liner ply 13 is conventional release liner, such as a conventional silicone release liner sheet. The adhesive 14 may be any conventional pressure sensitive adhesive or cohesive, removal or permanent. The typical thickness of the adhesive 14 is from 0.3–1.5 mil, typically between about 0.6–0.9 mil.

The plies 12, 13 have substantially co-extensive top and bottom edges 15, 16, respectively, substantially parallel to each other, and substantially co-extensive first and second side edges 17, 18 substantially parallel to each other and substantially perpendicular to the top and bottom edges 15, 16. While the side edges 17, 18 for a single intermediate are seen in FIG. 4, in FIGS. 1 and 2 the sheet 10 first needs to be slit along a center line defined by the arrows 19 before the second edge 18 (as seen in FIG. 1) for the leftmost intermediate 11, and the first edge 17 for the rightmost intermediate 11, are formed. The slitting along arrows 19 is performed using any conventional slitting equipment.

The first ply 12 has a top face 20 (see FIGS. 1 and 3) and a bottom face 21 (see FIG. 3) to which the adhesive or cohesive 14 adheres. The top face 20 is adapted to receive indicia, such as the indicia 22, 23, illustrated in FIGS. 1 and 5, which is imaged thereon, e.g. by a laser printer (defined by a laser toner), or the like. The top face 24 (see FIGS. 2 and 3) of the release liner ply 13 is siliconized so as to readily release from the adhesive 14.

The first and second side edges 17,18 of the paper ply 12 include first and second die cut strips, respectively. For example FIG. 1 shows the die cut lines 25, 26 defining the top and bottom of the strip 27 and parallel to the top and bottom edges 15, 16, and a longitudinal die cut line 28 substantially parallel to the side edge 17. To the right in FIG. 1 a second die cut strip 29 (for the rightmost intermediate 11 in FIG. 1) also has comparable top and bottom die cut lines 26, and a longitudinal die cut line 30 substantially parallel to the edge 18. The central die cut section 31 seen in FIG. 1 will, after slitting along the lines 19, form the second die cut strip 29 for the leftmost intermediate 11 in FIG. 1, and the first die cut strip 27 for the rightmost intermediate 11 in FIG. 1.

Note, as seen in FIG. 3, preferably die cuts 25, 26 (and 28, 30) only penetrate the paper ply 12, and do not penetrate (at least not completely) the release liner 13. The die cut lines 25, 26, 28, 30 are provided utilizing any conventional die cut equipment.

The paper ply 12 also comprises, for each intermediate, first and second lines of weakness 33, 34 which are seen as perforation lines in FIG. 1, and which are shown—just to provide context of where they may be found—in FIG. 2 by dash-dot line. Also a line of weakness 35 is preferably provided (this too shown in dot-dash line in FIG. 2 since it is not actually visible therein) which is substantially co-extensive with the die cut lines 26 and substantially parallel to the edges 15,16.

Above the die cut line 25 the first ply 12 comprises an upper section, shown schematically at 36 in FIG. 1, and below the die cut lines 26 the paper ply 12 comprises a lower section 37. As will be hereinafter described, the paper ply 12 also comprises first and second intermediate sections 38, 39 (see FIGS. 1 and 4) respectively, the first intermediate section 38 being adjacent and integral with the upper section 36, while the second intermediate section 39 is adjacent and integral with the lower section 37. Although not necessary, another line of weakness, shown faintly at 40 in FIG. 1, may be provided defining the demarcation between the intermediate sections 38, 39, which both have substantially the same length, and substantially the same length as the lower section 37, in the preferred embodiment. All of the lines of weakness 33, 34, 35 (and 40 if provided) may be perf lines, score lines, fold lines, or any other conventional line of weakness.

Figure 5:
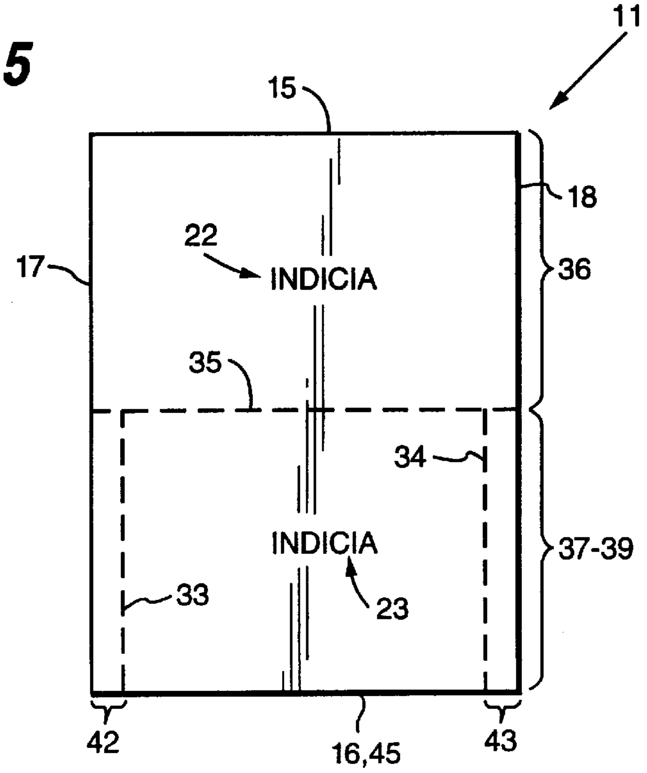
FIG. 5 is a top plan view of the card holder intermediate of FIG. 4 after folding of the lower and an intermediate section with respect to the upper and another intermediate section.

Please note, perhaps as best seen in FIGS. 4 and 5, side flaps 42, 43 are provided between the lines of weakness 33, 35 and the edges 17, 16, and between the lines of weakness 34, 35 and the edges 18, 16, respectively.

The release liner ply 13 also has various die cuts formed therein, perhaps as seen most clearly in FIGS. 2 through 4. The die cuts in the release liner 13 preferably comprise the die cuts 45 which are substantially parallel to, and closer to the top edge 15 than (see FIG. 3) the die cuts 25 in the paper sheet 12, and the longitudinal die cuts 46, 47, which are substantially parallel to, but spaced further from the edges 17,18, respectively, as seen in FIG. 2, the die cuts 28, 30. In the release liner 13 there also is a die cut 48 substantially parallel to the edges 15, 16 and provided equidistant between the upper section 36 and the lower section 37, and actually defining a line which will serve as a fold line (and therefore making a line of weakness 40 in the paper ply 12 unnecessary in most circumstances). The die cut line 48 defines the release liner 13 into a first portion which covers at least the upper section 36 (and as seen in FIG. 4 preferably both the sections 36, 38) and a lower portion which covers the sections 37, 39. The relative positions between the die cut line 30, 47, and 28, 46 are clearly seen in FIG. 4. All the die cut lines provided in the release liner 13 penetrate only the release liner 13 (as seen schematically in FIG. 3), not completely penetrating the first ply 12.

Figure 8:
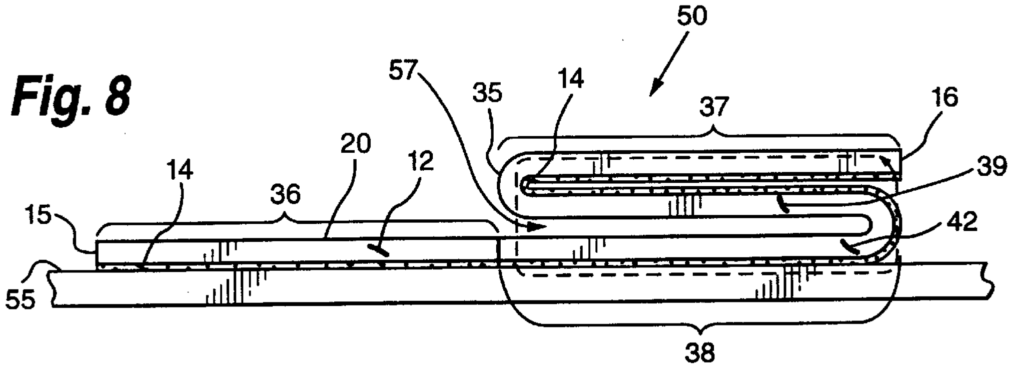
FIG. 8 is a side view, with the components greatly exaggerated in size, and relative size, for clarity of illustration, showing the library card holder of FIG. 7 attached to a library book, and showing the side flaps that had been folded over in dotted line.
Figure 7:
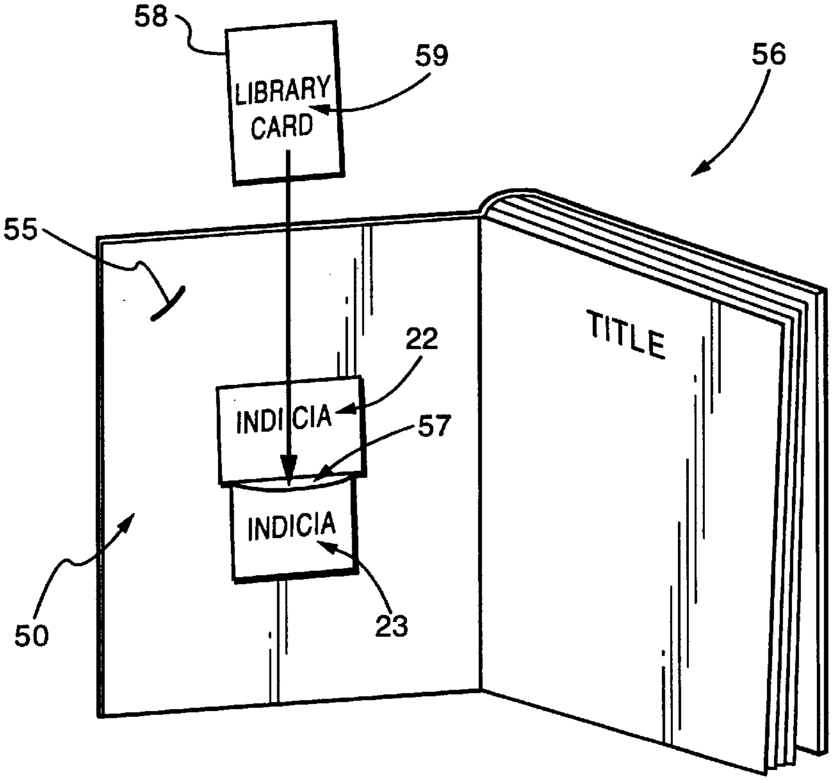
FIG. 7 is a schematic perspective view of the card holder of FIG. 6 shown attached to the inside cover of a library book, and schematically illustrating the insertion of a library card therein.
Figure 6:
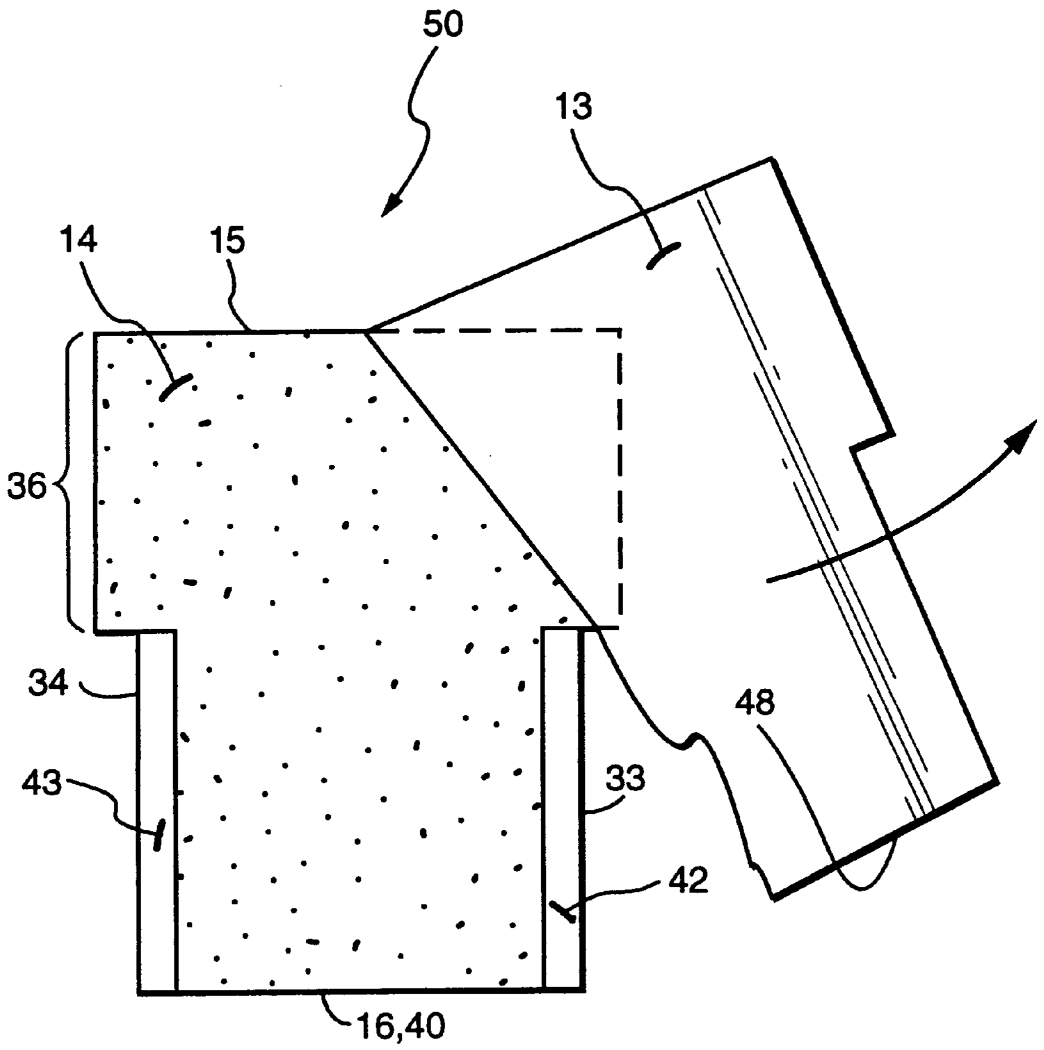
FIG. 6 is a rear view of the intermediate of FIG. 5 showing removal of the upper portion of the release liner, and after the side flap from the lower section have been folded to hold the lower and intermediate sections together.

In the manufacture of the card holder (shown as a library card holder) 50, which is seen in FIGS. 6 through 8, from the intermediate 11, shown in various stages in FIGS. 1 through 5, after imaging of the indicia 22, 23 (which may be variable or non-variable indicia) and slitting along the center lines 19 of the sheets 10, to form an individual intermediate 11, the die cut strips 27, 29, as well as the die cut strips 51, 52 (formed by the die cuts lines 45, 46 and 45, 47, respectively) are removed, preferably manually, and so is the release liner 13 from the die cut line 45 downwardly (as seen in FIG. 4). While the release liner 13 section seen in FIG. 4 can be removed, it is not necessarily removed, and may remain in place during subsequent formation of the card holder, except for those portions covering side flaps 42, 43 (as hereafter described).

Ultimately, the intermediate 11 is folded to the position illustrated in FIG. 5 by folding about the line of weakness 35 and about where the die cut 45 for the release liner 13 is provided, so that the sections 36 and 37–39 assumes the relative positions most clearly seen in FIGS. 5 and 8. When in this position, as illustrated in FIG. 5, then the release liner above the die cut line 48—as illustrated in FIG. 6—is removed. However typically before the removal of the upper section of the release liner 13—which is illustrated in FIG. 6—the side flaps 42, 43 of the section 37 are folded over so that the adhesive 14 thereon engages the adhesive 14 on the back face 21 of the first intermediate section 38, or the back 21 of the first intermediate section 38 itself if no adhesive 14 is provided by that, to hold all of the sections 37–39 together, as seen in FIG. 6, and as illustrated with the side flap 42 shown schematically in dotted line in FIG. 8. Because of the relative positions of the die cut lines 28, 46 and 30, 47, the side flaps 42, 43 may substantially be folded into the position illustrated in FIG. 6 without interfering with that portion of the release liner 13 between the die cut line 48 and that which covered the upper section 36 (as seen in FIG. 6). Then with the adhesive 14 exposed on the bottom face 21 of both the sections 36, 38, that adhesive is pressed into contact with a surface 55 (see FIGS. 6 and 8) of a book 56. In the embodiment illustrated in FIGS. 7 and 8, the surface 55 is the inside cover of the book 56.

The completed card holder 50 forms a pocket or open space 57 (see FIGS. 7 and 8) between the intermediate sections 38, 39 which is dimensioned so that it receives a conventional library card 58 (see FIG. 7) with conventional library card indicia 59 thereon.

While in the preferred embodiment of the invention, substantially the entire bottom face 21 of the first ply 12 is covered with adhesive 14, spot coatings can be applied if desired, and for example the adhesive on the second intermediate section 39 may be eliminated or minimized. Spot coating of adhesive may be practiced so that there is no adhesive around the die cuts (e.g. 46, 47) and/or edges (e.g. 15, 16, 19) so that processing and handling are easier. Also while all of the die cut lines described above are preferred, with slightly less convenience or functionality a number of them may be eliminated.

While the dimensions of the intermediate 11 and card holder 50 may vary depending upon the use and circumstances, in the preferred embodiment illustrated it is desirable that the length of the edge 15 (that is the width of the top section 36) of the intermediate 11 as illustrated in FIG. 5 be about 4.25 inches, or about 10.5 cm (half the width of an A-4 sheet), and that the length of the side edges 17, 18 of the intermediate 11 (as seen in FIG. 4) be either about 11 inches, or about 29.65 cm (the length of a conventional A-4 sheet).

It will thus be seen that according to the present invention a simple yet effective intermediate for a card holder, card holder per se, and method of making a card holder, have been provided, which have a number of advantages compared to the prior art. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and methods.

What is claimed is:

1. An intermediate for a card holder, comprising:

a first ply, a second release liner ply, and pressure sensitive adhesive or cohesive releasably holding said plies together;

said plies each having substantially coextensive top and bottom edges substantially parallel to each other, and substantially coextensive first and second side edges substantially parallel to each other and substantially perpendicular to said top and bottom edges;

said paper ply having a top face and a bottom face, said bottom face including said pressure sensitive adhesive or cohesive;

said first and second side edges of said first ply including first and second die cut strips, respectively, provided therein in a center section of said side edges, so that an upper section above said die cut strips, and a lower section below said die cut strips, are provided; and first and second lines of weakness provided in said first ply lower section substantially parallel to said side edges and spaced therefrom, and defining side flaps.

2. An intermediate as recited in claim 1 further comprising indicia imaged on said top face of at least one of said upper section and lower section.

3. An intermediate as recited in claim 1 wherein said top and bottom edges are each about 4.25 inches or about 10.5 cm long, and said side edges are each about 11 inches or about 29.6 cm long.

4. An intermediate as recited in claim 1 wherein said lower section has a length along each of said side edges about one half the length of each of said die cut strips.

5. An intermediate as recited in claim 1 wherein said liner ply has third and fourth, respectively, die cut strips formed therein at said first and second edges of said liner ply, each of said third and fourth die cut strips being wider than said first and second die cut strips, and extending from a point closer to said top edge than each of said first and second die cut strips substantially all the way to said bottom edge.

6. An intermediate as recited in claim 1 wherein said first ply comprises about 60–100 lb. paper tag stock, and wherein said pressure sensitive adhesive or cohesive covers substantially the entire bottom face of said paper ply and is removable or permanent adhesive and has a thickness between about 0.6–0.9 mil.

7. An intermediate as recited in claim 1 further comprising library card holder indicia imaged on said top face of at least one of said upper section and lower section.

8. An intermediate as recited in claim 1 wherein said lower section has a length along each of said side edges about one half the length of each of said die cut strips, wherein said liner ply has a die cut therein substantially parallel to said top and bottom edges, and approximately equidistant between said top and bottom sections; and wherein said liner ply has third and fourth, respectively, die cut strips formed therein at said first and second edges of said liner ply, each of said third and fourth die cut strips being wider than said first and second die cut strips, and extending from a point closer to said top edge than each of said first and second die cut strips substantially all the way to said bottom edge.

9. An intermediate as recited in claim 1 wherein said intermediate is part of a substantially 8.5 by 11 inch, or A-4, paper sheet, and wherein a second said intermediate substantially identical to said intermediate is provided side-by-side therewith in said substantially 8.5 by 11 inch, or A-4, paper sheet.

10. An intermediate as recited in claim 1 wherein said intermediate is folded to form a card holder, which comprises: an upper section having a top edge with a first width, and a bottom demarcation substantially parallel to said top edge, a top face, and a bottom face; a lower section having top and bottom substantially parallel edges each having a second width, a top face and a bottom face, and first and second side flaps defined along side edges thereof; first and second intermediate sections aligned with said lower section, said first intermediate section being a substantial continuation of said upper section, each of said intermediate sections having a front face and a rear face; pressure sensitive adhesive or cohesive provided on at least part of said bottom faces of both said upper and lower sections including on said lower section side flaps bottom face, and on at least a part of said rear face of at least said first intermediate section, so that pressure sensitive adhesive or cohesive on said lower section side flaps bottom face holds said lower section and said intermediate sections together, and so that said front faces of said intermediate sections define a non-adhesive open space therebetween; and wherein said upper, lower, and intermediate sections are substantially a continuous piece of paper.

11. An intermediate as recited in claim 3 wherein said intermediate is part of a substantially 8.5 by 11 inch, or A-4, paper sheet, and wherein a second said intermediate substantially identical to said intermediate is provided side-by-side therewith in said substantially 8.5 by 11 inch, or A-4, paper sheet.

12. An intermediate as recited in claim 3 wherein said first ply comprises about 60–100 lb. paper tag stock, and wherein said pressure sensitive adhesive or cohesive covers substantially the entire bottom face of said paper ply and is removable or permanent adhesive and has a thickness between about 0.6–0.9 mil.

13. An intermediate as recited in claim 4 wherein said first ply comprises about 60–100 lb. paper tag stock, and wherein said pressure sensitive adhesive or cohesive covers substantially the entire bottom face of said paper ply and is removable or permanent adhesive and has a thickness between about 0.6–0.9 mil.

14. An intermediate as recited in claim 4 wherein said liner ply has a die cut therein substantially parallel to said top and bottom edges, and approximately equidistant between said top and bottom sections.

15. An intermediate as recited in claim 14 wherein said liner ply has third and fourth, respectively, die cut strips formed therein at said first and second edges of said liner ply, each of said third and fourth die cut strips being wider than said first and second die cut strips, and extending from a point closer to said top edge than each of said first and second die cut strips substantially all the way to said bottom edge.

16. An intermediate as recited in claim 15 wherein said top and bottom edges are each about 4.25 inches or about 10.5 cm long, and said side edges are each about 11 inches or about 29.6 cm long.

17. An intermediate as recited in claim 15 wherein said intermediate is part of a substantially 8.5 by 11 inch, or A-4, paper sheet, and wherein a second said intermediate substantially identical to said intermediate is provided side-by-side therewith in said substantially 8.5 by 11 inch, or A-4, paper sheet.

18. An intermediate as recited in claim 5 wherein said intermediate is folded to form a card holder, which comprises: an upper section having a top edge with a first width, and a bottom demarcation substantially parallel to said top edge, a top face, and a bottom face; a lower section having top and bottom substantially parallel edges each having a second width, a top face and a bottom face, and first and second side flaps defined along side edges thereof; first and second intermediate sections aligned with said lower section, said first intermediate section being a substantial continuation of said upper section, each of said intermediate sections having a front face and a rear face; pressure sensitive adhesive or cohesive provided on at least part of said bottom faces of both said upper and lower sections including on said lower section side flaps bottom face, and on at least a part of said rear face of at least said first intermediate section, so that pressure sensitive adhesive or cohesive on said lower section side flaps bottom face holds said lower section and said intermediate sections together, and so that said front faces of said intermediate sections define a non-adhesive open space therebetween; and wherein said upper, lower, and intermediate sections are substantially a continuous piece of paper.

19. An intermediate as recited in claim 6 further comprising library card holder indicia imaged on said top face of at least one of said upper section and lower section.

20. An intermediate as recited in claim 19 wherein said lower section has a length along each of said side edges about one half the length of each of said die cut strips, wherein said liner ply has a die cut therein substantially parallel to said top and bottom edges, and approximately equidistant between said top and bottom sections; and wherein said liner ply has third and fourth, respectively, die cut strips formed therein at said first and second edges of said liner ply, each of said third and fourth die cut strips being wider than said first and second die cut strips, and extending from a point closer to said top edge than each of said first and second die cut strips substantially all the way to said bottom edge.

21. An intermediate as recited in claim 20 wherein said intermediate is folded to form a card holder, which comprises: an upper section having a top edge with a first width, and a bottom demarcation substantially parallel to said top edge, a top face, and a bottom face; a lower section having top and bottom substantially parallel edges each having a second width, a top face and a bottom face, and first and second side flaps defined along side edges thereof; first and second intermediate sections aligned with said lower section, said first intermediate section being a substantial continuation of said upper section, each of said intermediate sections having a front face and a rear face; pressure sensitive adhesive or cohesive provided on at least part of said bottom faces of both said upper and lower sections including on said lower section side flaps bottom face, and on at least a part of said rear face of at least said first intermediate section, so that pressure sensitive adhesive or cohesive on said lower section side flaps bottom face holds said lower section and said intermediate sections together, and so that said front faces of said intermediate sections define a non-adhesive open space therebetween; and wherein said upper, lower, and intermediate sections are substantially a continuous piece of paper.

22. An intermediate as recited in claim 9 wherein said first ply comprises about 60–100 lb. paper tag stock, and wherein said pressure sensitive adhesive or cohesive covers substantially the entire bottom face of said paper ply and is removable or permanent adhesive and has a thickness between about 0.6–0.9 mil.

* * * * *